(12) United States Patent
Williams et al.

(10) Patent No.: US 8,898,382 B2
(45) Date of Patent: Nov. 25, 2014

(54) STORAGE SYSTEM AND A METHOD OF CONTROL OF A STORAGE SYSTEM

(75) Inventors: Timothy P. E. Williams, Wokingham (GB); David Michael Davis, Portsmouth (GB)

(73) Assignee: Xyratex Technology Limited, Havant (GB)

( * ) Notice: Subject to any disclaimer, the term of this patent is extended or adjusted under 35 U.S.C. 154(b) by 421 days.

(21) Appl. No.: 13/041,029

(22) Filed: Mar. 4, 2011

(65) Prior Publication Data

US 2012/0226854 A1 Sep. 6, 2012

(51) Int. Cl.
*G06F 12/00* (2006.01)
*G06F 13/00* (2006.01)

(52) U.S. Cl.
CPC .............. *G06F 12/00* (2013.01); *G06F 13/00* (2013.01)
USPC ........... 711/114; 711/103; 711/154; 711/170; 711/E12.001; 711/E12.008

(58) Field of Classification Search
None
See application file for complete search history.

(56) References Cited

U.S. PATENT DOCUMENTS

| 2007/0093124 | A1* | 4/2007 | Varney et al. ................. 439/499 |
| 2008/0005618 | A1 | 1/2008 | Jones |
| 2011/0191637 | A1* | 8/2011 | Wight et al. .................... 714/43 |

* cited by examiner

*Primary Examiner* — Midys Rojas
(74) *Attorney, Agent, or Firm* — Pillsbury Winthrop Shaw Pittman LLP

(57) ABSTRACT

A storage system and a method of control of a storage system including plural storage media, at least one SAS expander physically connected to each of the plural storage media and to a controller via plural parallel data channels, the controller being connected to a host CPU arranged in use to execute input/output operations to transfer data to and read data from the plural storage media, the method including: at the expander, varying the available bandwidth for communication with the plural storage media by varying the available number of the plural parallel data channels thereby providing control of the number of input/output operations executed by the host CPU.

18 Claims, 3 Drawing Sheets

STORAGE SYSTEM AND A METHOD OF CONTROL OF A STORAGE SYSTEM

The present invention relates to a storage system and a method for control of a storage system. In particular, the invention relates to a method and apparatus for control of data flow within a storage system.

Typically, a data storage system that operates in accordance with existing data storage protocol will include plural storage media such as hard disk drives together with a controller arranged to communicate with a host central processing unit (CPU). The controller will be connected to (or will include) one or more expanders which effectively serve as multi-port switches to enable communication of data between the storage media and the host CPU.

Storage connections and protocols are continually evolving over time and thus the speed, capability and capacity of such protocols are similarly evolving. For example, one well known and utilised storage protocol is the Serial Attached SCSI (SAS) connection method and protocol which is common in storage systems. The standard includes specifications for channels and components within a system. Currently, each individual channel between a component within a SAS system is specified as needing to be at six Gigabits per second per lane. The previous revision of this specification, approximately one year ago, required only three Gigabits per second per lane and it is expected, in due course, that the next revision of the specification will require 12 Gigabits per second per lane.

FIG. 1 shows a schematic representation of a storage system. The system 2 includes a host CPU 4 connected to a controller 6, e.g. a SAS controller, which itself is connected to a SAS expander 8. It will of course be appreciated that a SAS expander is merely an expander that conforms to the SAS protocol. Similar storage systems might include corresponding components that operate in accordance with other storage protocols and the present disclosure is not therefore limited only to SAS systems.

Plural storage media 10 are provided which, in this case, might be hard disk drives. It is envisioned that any type of storage medium may be included. For example, in some cases solid state drives are provided as well as or instead of hard disk drives.

As can be seen, there are channels provided between each of the components in the system 2. In particular, there is a single channel between each of the storage media 10 and expander 8. There are plural channels provided between the expander and the controller. Also shown, but not of relevance to the present system is host memory 12.

The controller 6 is connected to the CPU 4 and the expander 8. The expander 8 is connected both to the controller 6 and to each of the storage media 10. In the example shown, there is only a single expander 8 provided. Twelve hard disk drives are provided with a four channel link between the expander and the controller.

In a system such as that of FIG. 1, using maximum data transfer and processing speed available today, the SAS bandwidth at the four channel link between the expander and the controller can provide is 2.4 Gigabits per second ($GiBs^{-1}$). This gives a maximum bandwidth of 200 Megabits per second ($MiBs^{-1}$) per disk drive which is sufficient for typical current data requirements. In addition, a typical controller is able to provide 300,000 input/output operations per second (IOPS) which again, split equally between the twelve disk drives gives approximately 50,000 IOPS per drive which is again, sufficient for today's capacities.

As mentioned above, it is envisaged that shortly twelve $GiBs^{-1}$ technology will be released and soon become industry standard. The same topology would therefore be capable of providing 400 $MiBs^{-1}$ and 83,000 IOPS per drive. Data rates at this sort of level are impressive and of great interest to the storage industry at large. Some issues arise. For example, a simple SAS topology created in the standard configuration shown in FIG. 1 using low cost parts is capable of providing bandwidth and data rates and IOPS that are far greater than would typically be required within a low end system. Furthermore, within a low cost system, the CPU 4 is likely to be a low cost device. When high numbers of IOPS are demanded of the CPU by the controller 6, significant capacity of a CPU is thus required to service the requests for the IOPS. Indeed, in some cases, the CPU can be utilised at 100% simply performing the IOPS.

According to a first aspect of the present invention, there is provided a method of control of a storage system comprising plural storage media, at least one expander, such as a SAS expander, physically connected to each of the plural storage media and to a controller via plural parallel data channels, the controller being connected in use to a host processor, the host processor being arranged in use to execute input/output operations to transfer data to and read data from the plural storage media, the method comprising: at the expander, varying the available bandwidth for communication with the plural storage media by varying the available number of the plural parallel data channels thereby providing control, or a limit, of the number of input/output operations executed by the host processor.

Thus, a method is provided by which the bandwidth of the storage system can effectively be "throttled" artificially so as to reduce the $MiBs^{-1}$ bandwidth that each disk drive can achieve. Although counter intuitive, this provides several clear technical advantages. For example, it provides a means by which the overall system IOPS can be reduced or controlled to be within a certain level. This in turn means that host CPU utilisation can be conserved or controlled so that it can be used for running one or more storage applications. In addition, the method can be easily introduced into a system using control of the expander by, for example, a software function Therefore the method provides for the enablement of flexible and changeable control of a storage system.

In one embodiment, the method comprises monitoring the temperature of the host processor and varying the available number of the plural parallel data channels in dependence on temperature of host processor. Thus, an additional, convenient and robust means for temperature control of the host processor is provided. Instead of requiring further temperature control apparatus e.g. additional fans to those ordinarily provided, control of the IOPS operations of the host CPU enables temperature control to be performed in a simple and reliable manner. Furthermore, since the control of the number of available channels can be performed using software, no further hardware would be required for this additional level of temperature control to be implemented.

In one embodiment, the available number of the plural parallel data channels are varied so as to provide a defined bandwidth of communication, e.g. in accordance with a service agreement. In some cases in a storage system, a system provider will have agreements with storage users to provide a defined level of performance e.g. bandwidth between the storage media and the controller or host. Use of the present method provides a simple and robust means by which this can be achieved. By simple control of the available number of channels for communication between storage media and, ultimately, a host CPU the communication bandwidth therebetween can be easily and efficiently controlled. Furthermore, since the control of the number of available channels can be performed using software, no further hardware would be required for this additional level of bandwidth control to be implemented.

In one embodiment, for example where there are connected two or more expanders off a first central or hub expander, by reducing the number of available channels between one pair of expanders, a greater proportion of processor operation can be used for remaining expander and its associated storage media. Thus, a simple and reliable means for controlling distribution of bandwidth and host processor operation amongst plural disks is provided. This, again, can be implemented using software, so that no further hardware would be required for this level of bandwidth control to be implemented. In some cases, it could be that one group of disks is to be given some first proportion of processor time and second group of disks is to be given a second, optionally different, proportion of processor time. By controlling the bandwidth or number of available channels between the appropriate pairs of expanders this can be easily achieved.

In one embodiment, the bandwidth is varied between the expander and the disk drives by selectively turning on or off one or more of the plural channels available for communication between the expander and the controller, i.e. ultimately between the expander and the host CPU.

In one embodiment, the expander is a SAS expander. As explained above, Serial Attached SCSI (SAS) is a communications protocol for use in a computer system and data may be moved to and from computer storage devices such as hard drives and tape drives. It is well known to a skilled person and therefore further description of its details will not be included.

According to a second aspect of the present invention, there is provided a storage system, comprising: plural storage media; at least one expander connected to each of the plural storage media the expander including an expander processor; a host processor arranged to execute input/output operations to transfer data to and read data from the plural storage media via the expander; in which the expander processor is arranged to vary the available bandwidth for communication with the plural storage media so as to throttle the number of input/output operations executed by the host processor.

Thus, as with the method referred to above, the present storage system enables the bandwidth of the storage system to be effectively "throttled" artificially so as to reduce the $MiBs^{-1}$ bandwidth that each disk drive can achieve. Similar advantages follow to those described above with respect to the method. In particular, the storage system is selectively reconfigurable using software to control the bandwidth of communication between the storage media and a host processor and thus related aspects of the storage system and its operation are also therefore controllable.

In an embodiment, the storage system comprises a temperature sensor to monitor the temperature of the host processor and provide a signal in response to which the available number of the plural parallel data channels is varied. Thus, the use of a temperature sensor enables the temperature of the host processor to be monitored and provides an additional, convenient and robust means for temperature control of the host processor is provided. Control of the IOPS operations of the host CPU enables temperature control to be performed in a simple and reliable manner, without a need for further hardware.

In an embodiment, the storage system comprises at least two expanders and two associated sets of storage media arranged so that the available number of channels for one or more of the sets of storage media is controllably varied so that a corresponding proportion of host processor operation can be used for the other set of storage media.

In an embodiment, there are at least three expanders, a first one being a hub (commonly referred to as a "root") expander and each of the other expanders branching from it referred to as "leaf" expanders. Each of the leaf expanders is connected to the root expander and their own set of storage media. It could be for example, that one set of storage media are of one type, e.g. hard disk drives, and the other set of storage media are of another type, e.g. solid state drives. These different types of storage media might require different levels of service and the desired flexibility can easily be provided by the present system and method.

In an embodiment, bandwidth is varied between the controller and the disk drives by selectively turning on or off one or more of the plural channels available for communication between the hub expander and the controller In an embodiment, the or each of the expanders is a SAS expander.

It will be appreciated that for both aspects of the invention described above any of the features described as being provided "in an embodiment" can be provided either alone or in combination with any other of such features as appropriate.

Embodiments of the present invention will now be described in detail with reference to the accompanying drawings, in which.

As explained above, in the present system, the bandwidth of the storage system is throttled artificially so as to reduce the $MiBs^{-1}$ bandwidth that each disk drive can achieve. Although counter intuitive, this provides several technical advantages.

First, by reducing the $MiBs^{-1}$ bandwidth of each disk drive, the overall system IOPS can be reduced or controlled to be within a certain level. By doing this, host CPU utilisation can be conserved or controlled so that it does not need to concentrate solely on performing the IOPS operations but instead can be used for running one or more storage applications, e.g. RAID or De-Dupe.

Furthermore, as will be explained below, due to the manner that the current method operates, it can be easily introduced into a system using control of the expander by, for example, a software function. In particular, typically a SAS expander includes an embedded processor on which software can be run. A software function can thus be used within the expander to control enablement of the SAS lanes or physical ports PHYs of the expander, and thereby throttle bandwidth of the storage system without the need for further or additional hardware.

Figure 1:
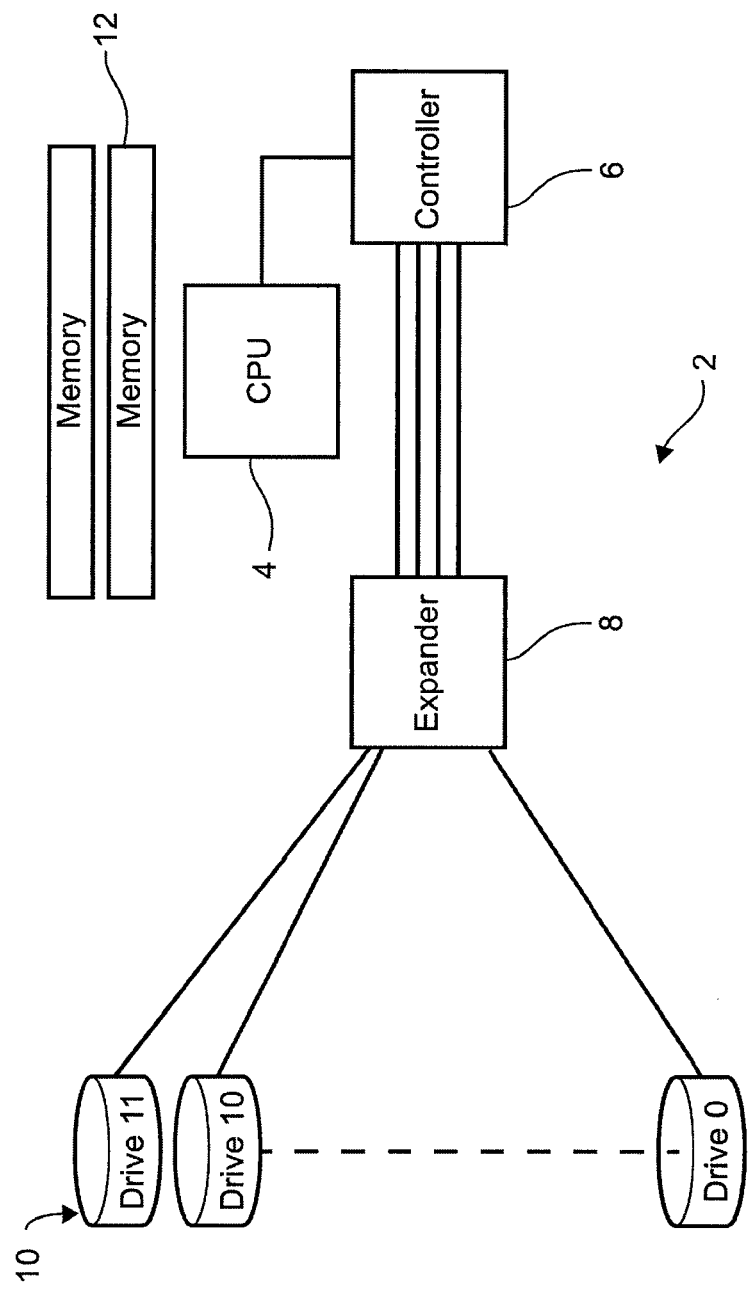
FIG. 1 is a schematic representation of a data storage system.
Figure 2:
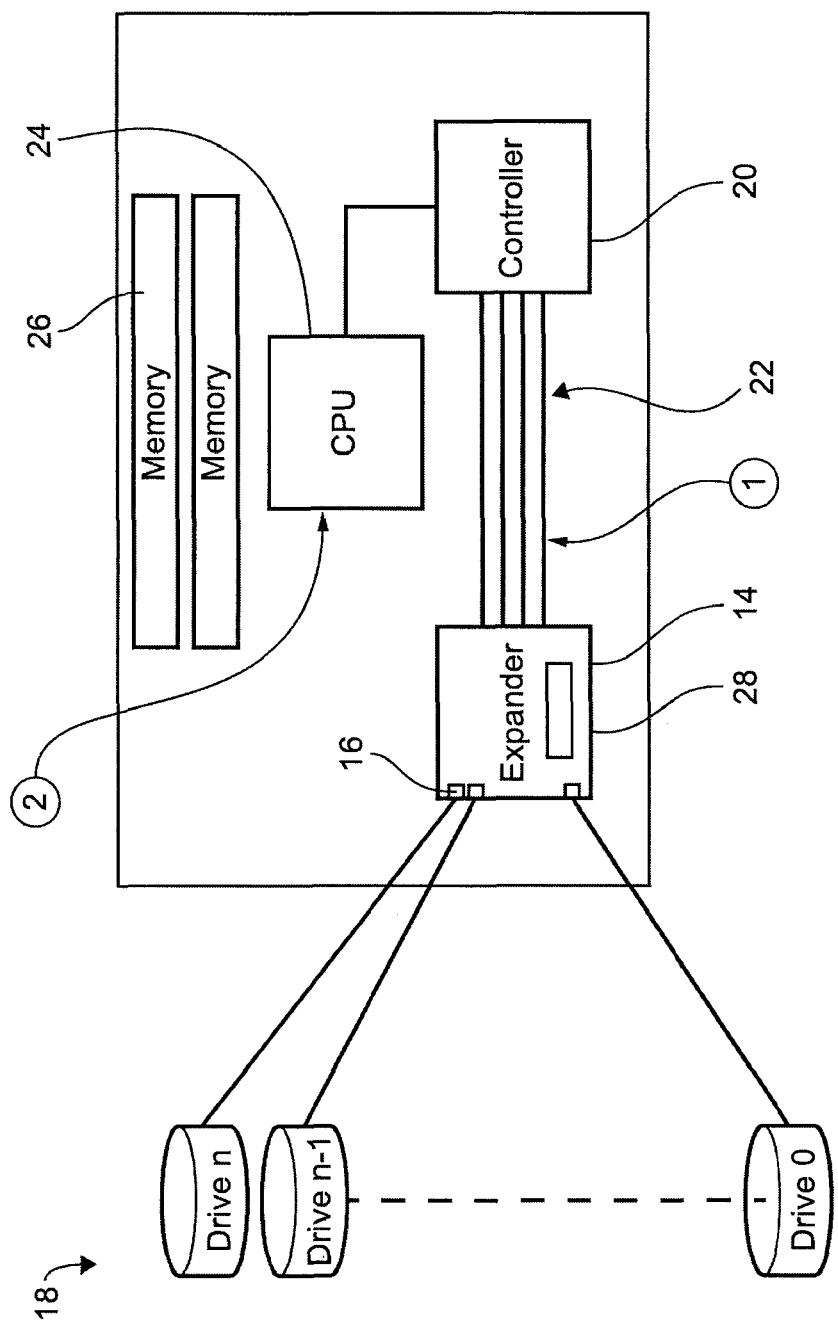
FIG. 2 is a schematic representation of a data storage system.

Referring now to FIG. 2, a storage system is provided including an expander 14. The expander 14 is connected via PHYs 16 to plural (n+1) storage media 18 labelled Drive 0 to Drive n, which in this case are hard disk drives. In addition, the expander 14 is connected to a controller 20 via plural channels 22. A host CPU 24 is provided together with host memory 26. The expander 14 includes its own embedded processor 28 which serves to run enclosure management software. In the present embodiment, the processor 28 is arranged to provide control of the SAS lanes 22 and in particular their enabled state. Thus, by software control executed via the processor 28, one or more of the lanes 22 can be disabled. This has the effect of limiting the bandwidth between the controller 20 and the expander 14 and therefore limiting the IOPS operations performed by the CPU 24.

As can be seen in FIG. 2, a reduction in the number of lanes 22 reduces both the bandwidth and the IOPS performance of the interconnect between the controller 20 and the expander 14. The restriction of this capability restricts the ability of the host CPU to process data as quickly and therefore throttles performance of the CPU. The host CPU is part of every transaction, and so small data movements give rise to high IOPS and high CPU loads. For large data movements the performance of the host CPU is not such a constraint and there are fewer transactions (per unit volume of transferred data), but the constrained bandwidth may still restrict the number of transactions that can be completed.

In addition, this functionality can be used to control the CPU temperature since if one or more of the lanes 22 are disabled then the number of IOPS that the CPU can perform will be reduced which will consequently reduce the temperature of the host CPU.

With SAS controllers and expanders that are typically available today, it can be demonstrated that reducing the number of lanes 22 down from 4 to 1, will limit the IOPS to a maximum of 50,000 which is about 4000 IOPS per disk drive in a twelve disk drive system. Similarly, the SAS bandwidth for communication between the disk drives and the controller is reduced to approximately 600 MiBs$^{-1}$ which equals approximately 50 MiBs$^{-1}$ per disk drive. For a low end CPU, this can reduce the CPU overhead from approximately 80% to approximately 12% when dealing with small block transfers. In other words, when there would be plural IOPS required for the transfer of any sizeable amount of data, by reducing the available bandwidth, the IOPS count can be significantly reduced thereby enabling the processor to perform other functions as well within its capacity or simply keeping down the temperature of the CPU.

Thus far, as described with FIG. 2, the method of disabling one or more data paths between an expander and controller has been described with reference to a simple storage system topology in which there is a single expander 14 connected to a single controller 20. However, in situations in which the storage system is more complex and a tree structure of expanders is provided, the method of disabling selected data paths between one or more expanders and a controller enables significant control capabilities to be provided such that it is possible to control the performance aspect of the system in an enhanced manner.

Figure 3:
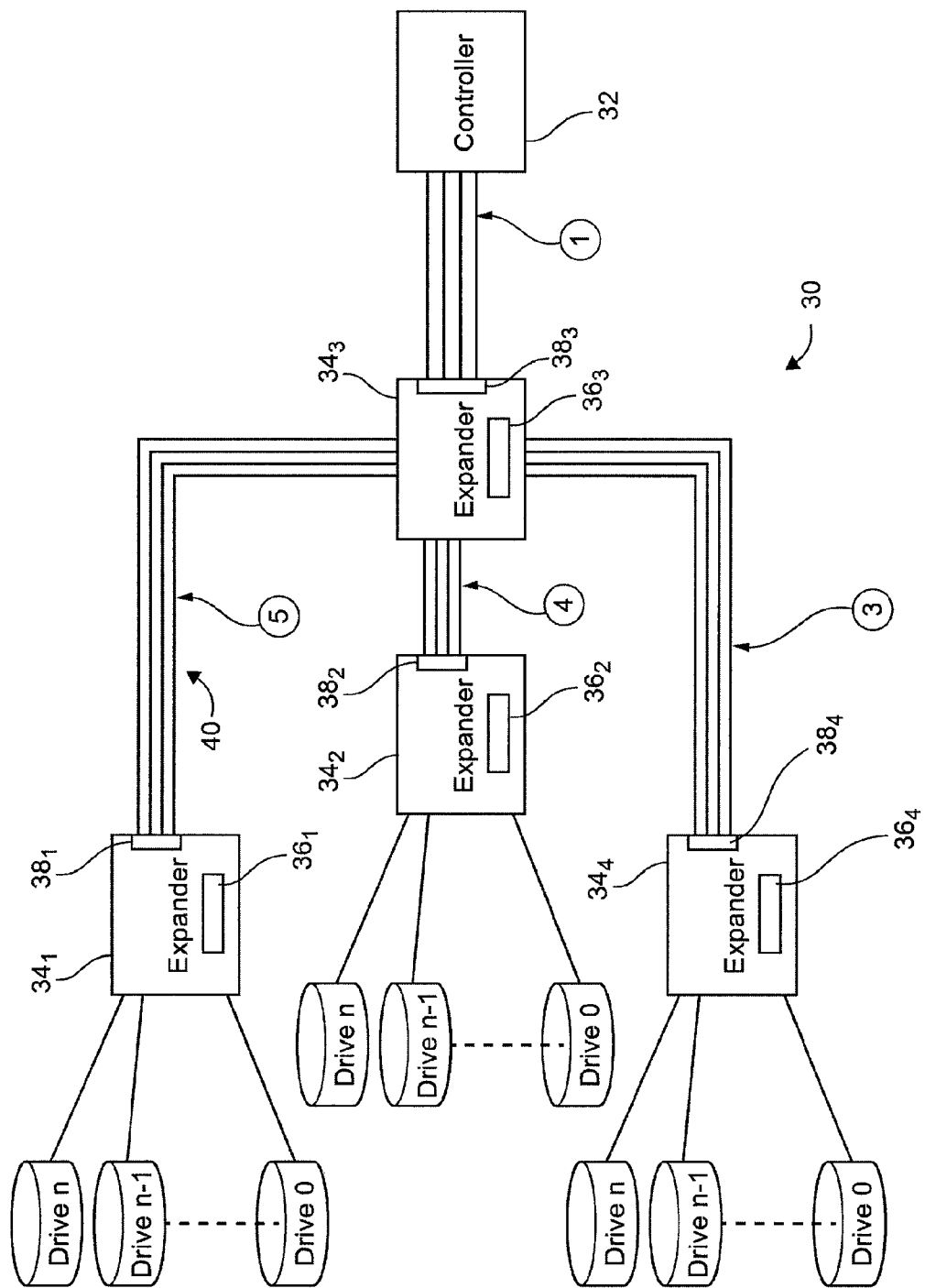
FIG. 3 is a schematic representation of a data storage system.

With reference to FIG. 3, an example of the system in which plural expanders are provided will now be described. Referring to FIG. 3, a storage system 30 is provided. The system includes a controller 32 connected to a host CPU (not shown). In this example, four expanders $34_1$ to $34_4$ are provided connected in a tree-like structure. It will be appreciated that what is significant is that there are plural expanders in a tree-like structure. The precise number in any example will depend on the configuration of the storage system and factors such as the number of disk drives and performance requirements of the system. Thus, the example of FIG. 3 is in no way limiting.

The first of the expanders $34_3$ is effectively a hub or root that connects the other three leaf expanders $34_1$, $34_2$ and $34_4$ to the controller 32. Plural data paths are provided between each of the peripheral expanders $34_1$, $34_2$ and $34_4$ and the hub expander $34_3$. In addition, plural channels are provided between the hub or root expander $34_3$ and the controller 32. Each of the expanders includes a corresponding embedded processor $36_1$ to $36_4$. The expander processors 36 are arranged to control operation of the respective expander and to selectively turn on or off one or more of the ports of PHYs on the respective expander. For example, for expander $34_1$, a processor $36_1$ is provided. The processor $36_1$ is arranged to control the PHYs $38_1$ such that it is able to selectively enable or disable one or more of the channels 40 between the expander $34_1$ and the hub expander $34_3$. In fact, the control in this case is likely to be done from the root expander $34_3$ rather than the leaf expander. Its embedded processor $36_3$ will be able to control the lanes to all of the leaf expanders. Accordingly, although control could be done from the leaf level, it is referred that it is done from the root expander closer to the controller 32.

Since the capacity of the host CPU (not shown) is fixed, if the amount of host CPU capacity needed to perform the IOPS for expander $34_1$ is reduced, there is more of the capacity available for performing IOPS in respect of expanders $34_2$ and $34_4$. Hence, by use of software on the processor $36_1$ provided on expander $34_1$, tuneable performance with respect to the entire storage system is effectively enabled. This may be referred to as bandwidth shaping since the bandwidth profile across the storage system may be controlled.

The "hub" arrangement of the expanders in FIG. 3 is in no way limiting. In another example there is no "hub" expander. Instead, each of the branches of the tree connects directly to the controller. However, even with such an alternative configuration the same control can effectively be achieved by enabling (or disabling) the appropriate channels within each of the branches. What is important is the number of available channels or bandwidth between the controller and each set of the storage media.

In one example, the system 30 is arranged to provide tiered performance such that the drives connected to expander $34_1$ receive a different level of service from the drives connected to expanders $34_2$ and $34_4$. Hence, by the present method of controlling the number of paths between a hub expander (or more generally a controller 32) and the leaf expanders with respect to the disks in question, a method for providing distributed capabilities and tiered performance is enabled.

Furthermore, since each of expanders $34_1$ to $34_3$ includes its own processor 36, performance of the system as a whole is tuneable and controllable in an entirely flexible manner. Indeed, since the function of the processors $36_1$ to $36_4$ in controlling the PHYs $38_1$ to $38_4$ may be achieved via software running on processors $36_1$ to $36_4$ it is possible that the system could be built and assembled physically once and once only and then the performance can be changed by software updates without requiring any modification of the hardware (other than the software induced modification of the enabling and disabling of the PHYs).

In some cases, the system could actually be used in such a way that when originally provided to a user or customer, some of the PHYs can be disabled thus providing for the expander in question and the corresponding connected disk drives a reduced level of performance. The user would then be able to increase the performance by use of a software key or license which can be purchased and sold separately. Hence, an entirely flexible storage system is provided.

It will be appreciated that by reducing the lane count between certain expander pairs or expander and controller, the performance down a particular branch of the storage system can be correspondingly reduced. The same overall performance throttling for each and every one of expanders $34_1$, $34_2$ and $34_4$ can be achieved by reducing the lane count between the controller 32 and the hub expander $34_3$. When one of the lanes between a connected pair of expanders is turned off, this provides the benefit of more overall system bandwidth capability to other branches, thus a flexible tiered storage architecture can be implemented and controlled with slow storage devices having their performance turned down to match their bandwidth/IOPS capability allowing for faster devices such as solid state drives to have more of the overall system bandwidth.

Accordingly, whilst reducing the bandwidth between the expander and the controller has the effect of the IOPS performance of the interconnect between the controller and the expander being similarly reduced, and therefore an effect on all downstream expanders, the effect can also be used further down the tree structure by turning off one or more of the lanes between any pair of expanders. Thus, preferential bandwidth can be provided to some parts of the system while restricting others. Indeed, in a storage system including plural types of storage media the bandwidth provided to the different storage media can be applied in a corresponding manner. For example, when a storage system includes SSDs and rotating disks (e.g. hard disk drives), most bandwidth can be provided to SSDs rather than to the slower rotating disks. This can occur with in an enclosure and/or via externally cabled enclosures.

This arrangement can be provided either within a defined storage enclosure or via externally cabled enclosures. Indeed, the same performance management can be applied to external/expansion storage enclosures as well; both to the internal links and external cabled links. For systems that do not include expanders the same performance management can be applied to the controller PHYs by writing software that controls the state of the controller PHYs. Hence, using such techniques the storage system provided has a wide and flexible performance range. This will mean that in practice the same actual product can be provided into different storage markets or tiers by having the software limit the overall performance as required.

It will be appreciated, that one important feature of the present system is that it can be controlled at the expander/enclosure management level and is thus independent of any programs running on a host CPU. In this way, an enclosure manufacturer is able to protect operation of the host CPU and ensure that it is within thermal limits no matter what customer or end user application is running on the CPU. In other words, by determining the available bandwidth between the controller(s) and expanders in the system, it is possible to ensure that the host CPU is never exposed to conditions that could potentially cause damage to it.

Preferably, such controls are provided in cooperation with any applications running on the proposed CPU and this can be provided via vendor unique SCSI enclosure services (SES) pages.

The software that can be provided, in one embodiment, to run on an expander or enclosure CPU can be provided in any known format or program and such programming is within the knowledge of the skilled person.

Embodiments of the present invention have been described with particular reference to the examples illustrated. However, it will be appreciated that variations and modifications may be made to the examples described within the scope of the present invention.

The invention claimed is:

1. A method of control of a storage system comprising plural storage media, at least one expander physically connected to each of the plural storage media and to a controller via plural parallel data channels, the controller being connected in use to a host processor, the host processor being arranged in use to execute input/output operations to transfer data to and read data from the plural storage media, the method comprising:

at the expander, varying the available bandwidth for communication with the plural storage media by varying the available number of the plural parallel data channels between the controller and the expander thereby providing control of the number of input/output operations executed by the host processor, and monitoring the temperature of the host processor and varying the available number of the plural parallel data channels between the controller and the expander in dependence on the monitored temperature of the host processor.

2. A method according to claim 1, in which at least one of the expanders is a SAS expander.

3. A method according to claim 1, in which the storage system comprises at least two expanders and associated sets of storage media and in which the method comprises reducing the available number of channels for one of the sets of storage media so that a greater proportion of host processor capacity can be used for the other sets of storage media.

4. A method according to claim 1, in which there are at least two expanders provided, a first one being a hub expander and the other being connected to the hub expander and a set of storage media, thereby defining at least two stages of a data storage network the method comprising varying the available number of the plural parallel data channels across at least two of the stages of the data storage network.

5. A method of control of a storage system comprising plural storage media, at least one expander physically connected to each of the plural storage media and to a controller via plural parallel data channels, the controller being connected in use to a host processor, the host processor being arranged in use to execute input/output operations to transfer data to and read data from the plural storage media, the method comprising:

at the expander, varying the available bandwidth for communication with the plural storage media by varying the available number of the plural parallel data channels between the controller and the expander thereby providing control of the number of input/output operations executed by the host processor, in which the available number of the plural parallel data channels are varied so as to provide a defined bandwidth of communication in accordance with a service agreement.

6. A method according to claim 5, in which at least one of the expanders is a SAS expander.

7. A method of control of a storage system comprising plural storage media, at least one expander physically connected to each of the plural storage media and to a controller via plural parallel data channels, the controller being connected in use to a host processor, the host processor being arranged in use to execute input/output operations to transfer data to and read data from the plural storage media, the method comprising:

at the expander, varying the available bandwidth for communication with the plural storage media by varying the available number of the plural parallel data channels between the controller and the expander thereby providing control of the number of input/output operations executed by the host processor, in which the storage system comprises at least two expanders and associated sets of storage media and in which the method comprises reducing the available number of channels for one of the sets of storage media so that a greater proportion of host processor capacity can be used for the other sets of storage media.

8. A method according to claim 7, in which there are at least three expanders provided, a first one being a hub expander and each of the others being connected to the hub expander and their own set of storage media.

9. A method according to claim 8, in which bandwidth is varied between the controller and the disk drives by selectively turning on or off one or more of the plural channels available for communication between the hub expander and the controller and/or between the hub expander and one or more of the other expanders.

10. A method according to claim 8, in which at least one of the expanders is a SAS expander.

11. A method according to claim 7, in which at least one of the expanders is a SAS expander.

12. A storage system, comprising
plural storage media;
at least one expander connected to each of the plural storage media the expander including an expander processor;
a host CPU including a controller, the host CPU being arranged to execute input/output operations to transfer data to and read data from the plural storage media;
in which the expander processor is arranged to vary the available bandwidth for communication with the plural storage media by varying the available number of data channels between the controller and the expander so as to throttle the number of input/output operations executed by the host CPU, and
a temperature sensor to monitor the temperature of the host processor and provide a signal in response to which the available number of the plural parallel data channels is varied.

13. A storage system according to claim 12, in which the storage system comprises at least two expanders and associated sets of storage media arranged so that the available number of channels for one or more of the sets of storage media is controllably varied so that a corresponding proportion of host processor operation can be used for the other set or sets of storage media.

14. A storage system according to claim 12, in which there are at least three expanders provides, a first one being a hub expander and each of the others being connected to the hub expander and their own set of storage media.

15. A storage system according to claim 14, in which bandwidth is varied between the controller and the disk drives by selectively turning on or off one or more of the plural channels available for communication between the hub expander and the controller and/or between the hub expander and one or more of the other expanders.

16. A storage system according to claim 12 in which the or each of the expanders is a SAS expander.

17. A storage system according to claim 12, in which bandwidth is varied between the controller and the disk drives by selectively turning on or off one or more of the plural channels available for communication between the hub expander and the controller and/or between the hub expander and one or more of the other expanders.

18. A storage system according to claim 17, in which the or each of the expanders is a SAS expander.

\* \* \* \* \*